(12) United States Patent
Li et al.

(10) Patent No.: US 10,289,939 B2
(45) Date of Patent: May 14, 2019

(54) IMAGE CLASSIFICATION METHOD AND IMAGE CLASSIFICATION APPARATUS

(71) Applicant: YULONG COMPUTER TELECOMMUNICATION SCIENTIFIC (SHENZHEN) CO., LTD., Guangdong (CN)

(72) Inventors: Changning Li, Guangdong (CN); Yanyan Zhang, Guangdong (CN); Yuezhong Mu, Guangdong (CN)

(73) Assignee: YULONG COMPUTER TELECOMMUNICATION SCIENTIFIC (SHENZHEN) CO., LTD., Guangdong (CN)

( * ) Notice: Subject to any disclaimer, the term of this patent is extended or adjusted under 35 U.S.C. 154(b) by 48 days.

(21) Appl. No.: 15/327,626

(22) PCT Filed: Jul. 21, 2014

(86) PCT No.: PCT/CN2014/082657
§ 371 (c)(1),
(2) Date: Jun. 12, 2017

(87) PCT Pub. No.: WO2016/011589
PCT Pub. Date: Jan. 28, 2016

(65) Prior Publication Data
US 2017/0308772 A1    Oct. 26, 2017

(51) Int. Cl.
*G06K 9/62*     (2006.01)
*G06K 9/00*     (2006.01)
(Continued)

(52) U.S. Cl.
CPC .............. *G06K 9/628* (2013.01); *G06F 9/44* (2013.01); *G06K 9/00362* (2013.01);
(Continued)

(58) Field of Classification Search
CPC .. G06K 9/628; G06K 9/00362; G06K 9/4647; G06K 9/6215; G06K 9/627; G06F 9/44; G06T 7/0002
See application file for complete search history.

(56) References Cited

U.S. PATENT DOCUMENTS

| | | | |
|---|---|---|---|
| 6,301,440 B1 | 10/2001 | Bolle et al. | |
| 6,535,636 B1 * | 3/2003 | Savakis | G06T 7/0002 359/670 |

(Continued)

FOREIGN PATENT DOCUMENTS

| | | |
|---|---|---|
| CN | 101170940 | 4/2008 |
| CN | 101414348 | 4/2009 |
| CN | 103412753 | 11/2013 |

OTHER PUBLICATIONS

PCT Search Report for corresponding PCT International Appication No. PCT/CN2014/082657 dated Apr. 20, 2015, 6 pages.

(Continued)

*Primary Examiner* — David F Dunphy
(74) *Attorney, Agent, or Firm* — Lee & Hayes, P.C.

(57) ABSTRACT

The present invention provides an image classification method, comprising: an analyzing step of analyzing the quality of any image; and a determining step of determining a quality category to which the any image belongs according to the analyzing result, wherein the quality categories include a first quality category recommended to be saved and a second quality category recommended to be deleted. Correspondingly, the present invention further provides an image classification apparatus. Through the technical scheme of the present invention, images can be classified according to the quality of the images, so that the user experience is improved.

16 Claims, 3 Drawing Sheets

(51) Int. Cl.
*G06K 9/46* (2006.01)
*G06T 7/00* (2017.01)
*G06F 9/44* (2018.01)

(52) U.S. Cl.
CPC ........... *G06K 9/4647* (2013.01); *G06K 9/627* (2013.01); *G06K 9/6215* (2013.01); *G06T 7/0002* (2013.01); *G06T 2207/10024* (2013.01); *G06T 2207/20021* (2013.01); *G06T 2207/30168* (2013.01)

(56) References Cited

U.S. PATENT DOCUMENTS

| | | | | |
|---|---|---|---|---|
| 2006/0126093 | A1* | 6/2006 | Fedorovskaya | .... G06K 9/00255 358/1.14 |
| 2009/0136125 | A1 | 5/2009 | Fujita | |
| 2010/0259640 | A1* | 10/2010 | Su | .......................... G06T 7/0002 348/231.2 |
| 2011/0080616 | A1 | 4/2011 | Yang et al. | |
| 2011/0264641 | A1* | 10/2011 | Yang | ................... G06F 17/3028 707/706 |

OTHER PUBLICATIONS

EP Search Report for corresponding EP Patent Application No. 14898089.9 dated Feb. 27, 2018, 10 pages.

\* cited by examiner

IMAGE CLASSIFICATION METHOD AND IMAGE CLASSIFICATION APPARATUS

TECHNICAL FIELD

The present invention relates to the technical field of image processing, and in particular to an image classification method and apparatus.

BACKGROUND

Figure 1:
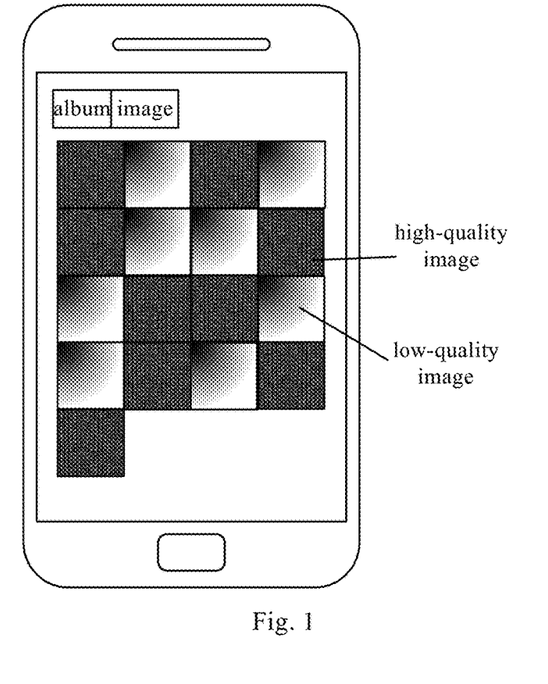
FIG. 1 shows a mobile phone album interface in prior art.

When shooting images, a user often takes low-quality images due to the quality of shooting devices or the user's shooting techniques, and the generally defined low quality includes image blurring caused by shake or out-of focus, image smear caused by relative movement, and excessive noise in night-view images, which usually affect the user's perception from the definition. After shooting images by using cameras, mobile phones or tablet computers, people can browse the shot images one by one, as shown in FIG. 1, a plurality of images are listed on a mobile phone album interface, and the user can open each image to judge the quality of the image, and can delete poor-quality images one by one when judging that the quality of the shot images is not good, and back up the rest images in a hard disk or in the cloud. However, the manner of viewing and identifying images one by one is very time-consuming, and in some cases, the user does not judge the quality of the images and will not delete any image and even directly back up the images without viewing and identifying the images, which leads to backup of many low-quality images and a great waste of storage space.

Therefore, how to classify images becomes an urgent problem to be resolved at present.

SUMMARY

Based on the above problems, the present invention provides a new technical scheme for classifying images according to the quality of the images.

In view of the above, the present invention provides an image classification method that comprises: an analyzing step of analyzing the quality of any image; and a determining step of determining a quality category to which the any image belongs according to the analysis result, wherein the quality categories include a first quality category recommended to be saved and a second quality category recommended to be deleted.

In this technical scheme, the quality of an image can be judged according to the characteristics (for example, definition) of the image so as to classify the image based on the quality of the image, images of which the category meets quality requirements are recommended to be saved, and images of which the category does not meet the quality requirements are recommended to be deleted. In this way, all the images in a category can be saved or deleted through image classification, so that operation time of the user is saved, operation convenience of the user is improved, and a lot of storage space can be saved by deleting images in the category which does not meet the quality requirements.

In the aforementioned technical scheme, preferably, the analyzing step specifically comprises: calculating the definition degree of the any image according to a preset definition degree calculating function; and the determining step specifically comprises: determining that the any image belongs to the second quality category when the definition degree of the any image is smaller than a preset image definition degree, and determining that the any image belongs to the first quality category when the definition degree of the any image is greater than or equal to the preset image definition degree.

In this technical scheme, the definition degree of the image can be used as a quality standard of the image. In general, clear images contain more information than unclear images, and the use of an evaluation function as the preset definition degree calculating function can reflect a numerical value which represents the definition degree of the image. A reference image that the evaluation function is at the maximum value is an image with the optimal definition degree. At present, definition degree evaluating method functions include gradient functions, frequency spectrum functions and entropy functions.

For example, a Tenengrad function in the gradient functions is used to calculate edge gradient values in the horizontal and vertical directions of an image, and the sum of squares of the edge gradient values is used to set a definition degree range of the image. The Tenengrad function uses a soble operator to extract the edge gradient values, and the sum of squares of the gradient values is:

$$f(I) = \sum_x \sum_y [S(x, y)]^2$$

wherein $S(x, y)$ is the convolution with the Soble operator at a point $(x, y)$, and the calculation formula is:

$$S(x,y) = \sqrt{G_x^2(x,y) + G_y^2(x,y)}$$

wherein $G_x(x, y)$ and $G_y(x, y)$ are gradient approximations of the image in the transverse and longitudinal directions, respectively.

In addition, the frequency spectrum function can also be used, and two-dimensional Fourier transformation is used to analyze the spatial frequency of the image, so that high-frequency components and low-frequency components of the image are separated, clear images have sharper and more jumping edges and contain more high-frequency components, and therefore, the definition degree of the image can be determined by evaluating the high-frequency components of the image. However, the use of the frequency spectrum function to evaluate the definition degree causes large calculation quantity which may affect the efficiency of image processing.

In the aforementioned technical scheme, preferably, the method further comprises: acquiring all images, successively determining the similarity degree between a current image and a previous image of the current image in the order of all the images, defining the current image and the previous image as images in a same group when the similarity degree is greater than or equal to a preset similarity degree, and defining the current image and the previous image as images in different groups when the similarity degree is smaller than the preset similarity degree.

In this technical scheme, since a user often shoots a plurality of images of different qualities for a certain scene, it is necessary to firstly judge whether the plurality of images belong to the same scene or not, and then to identify the images of the same scene. Images of the same scene, due to their high similarity degree, have small differences in definition even if differences in quality exist, therefore, after initial judgment, the images are generally classified into a same group, and a lot of storage space can be occupied if the images with the same shooting contents are directly saved, but if the images with the same shooting contents are directly deleted, it is difficult to guarantee that the user will not use the images. Therefore, the images with the repeated contents need to be screened again.

In the aforementioned technical scheme, preferably, the step of determining the similarity degree between a current image and a previous image of the current image specially comprises: individually dividing the current image and the previous image into a plurality of macroblocks, acquiring RGB values of the macroblocks of each image and converting the RGB values into YUV luma and chrominance components; and individually calculating standard deviation values of the YUV components of corresponding macroblocks in the current image and the previous image, and summing up the YUV standard deviation values of all the macroblocks so as to obtain the similarity degree between the current image and the previous image.

In this technical scheme, each image is divided into 32×32 macroblocks, RGB values of the macroblocks of each image are acquired and converted into YUV luma and chrominance components, standard deviation values of the YUV components of corresponding macroblocks in the two images are individually calculated, the YUV standard deviation values of all the macroblocks are summed up, and the two images are considered to be relatively similar when the summation value is less than a certain threshold.

In the aforementioned technical scheme, preferably, the method further comprises: counting the number of images in each same group; when the number of images in any same group is one, determining that the image in the any same group belongs to the first quality category, or prompting a user to select a quality category to which the image in the any same group belongs, and determining that the image in the any same group belongs to the first quality category or the second quality category according to the user's selection; when the number of images in the any same group is plural, comparing the qualities of a plurality of images, and ranking the plurality of images according to the comparison result, and determining that a preset number of top-ranked images in the plurality of images belong to the first quality category, and determining that the rest images in the plurality of images belong to the second quality category.

In this technical scheme, when only one image is shot for a certain scene, even if the quality of the image is low, the user may still want to save the image, and therefore, when it is detected that the number of images in the any same group is one, the group can be directly classified into the first quality category and recommended to be saved; alternatively, the user can be prompted that the image in the group has low quality and should be classified into the second quality category and is provided with two options, i.e. the first quality category and the second quality category, and the category of the image in the group is determined by the user according to his/her own needs. The images with the same contents but different qualities shot for a certain scene by the user are generally classified into the same group because of their high similarity degree, and if the image group is directly saved, a lot of storage space will be occupied and it is also meaningless to save many repeated contents, however, if such image group is directly deleted, it is difficult to guarantee that the user will not use the images. Therefore, the images in the image group can be ranked according to the image quality, and a preset number can be set, so that a preset number of top-ranked images, i.e. the images with relatively high quality, are classified into the first quality category, and the rest lower-ranked images in the image group, i.e. the images with relatively low quality, are classified into the second quality category. In this way, images which may be useful to the user can be guaranteed not to be lost, and a waste of storage space caused by saving too many images with repeated contents can also be avoided.

In the aforementioned technical scheme, preferably, the step of when the number of images in the any same group is plural, comparing the qualities of a plurality of images, and ranking the plurality of images according to the comparison result specifically comprises: determining whether main characters of the plurality of images are human beings or not when the number of images in the same group is plural; detecting human body image information of each image in the plurality of images when the determining result is that the main characters of the plurality of images are human beings, so as to obtain a first detection result, wherein the human body image information includes information of the total area and position that a human body occupies in the image, human face information and five-sense-organ information; and ranking the plurality of images according to the first detection result.

In this technical scheme, when the main character is a human being, human body detection is firstly conducted and whether a detected human body is the main character in the image is determined from the total area and position that the human body occupies in the image, then human face detection and five-sense-organ detection are conducted on the main character; if no human face or five sense organs is detected, it indicates that the image is not wanted by the user and is probably an image taken by mistake, and the image can be put among low-quality images of the second quality category for further selection; for an image in which both the human face and five sense organs can be normally detected, the quality of the image can be determined by using detection in dimensions such as exposure detection, sharpness detection and noise detection, so as to rank the images in the group.

Wherein, the exposure detection is to judge whether the image is over-exposed or not by determining whether an average brightness of the image is greater than a threshold, and over-exposed images are put into the second quality category by the exposure detection and recommended to be deleted. The average brightness is equal to the product of (total picture brightness value/total pixel number) and a scene exposure coefficient. The scene exposure coefficient is related to a specific scene, the concept of the scene exposure coefficient is designed based on the consideration that different scenes have different brightness values, for example, scenes of snow and sunlight have very high brightness, and the higher the brightness of the scene is, the smaller the scene exposure coefficient is, thereby preventing that an average brightness value obtained in scenes of snow and sunlight exceeds the threshold. The sharpness detection is to conduct statistics on grey-scale changes in a certain edge direction of the image through an edge sharpness detection algorithm so as to evaluate the quality of the image, that is, the intenser the grey-scale changes are, the clearer the edge is, and the higher the quality of the image is. The noise detection is to identify noise based on a grey correlation coefficient in each pixel between a noise-containing image and a corresponding mean value image.

In the aforementioned technical scheme, preferably, the step of comparing the qualities of a plurality of images when the number of images in the any same group is plural, and ranking the plurality of images according to the comparison result further comprises: detecting brightness information, sharpness information and noise information of each image in the plurality of images when the determining result is that main characters of the plurality of images are objects, so as to obtain a second detection result; and ranking the plurality of images according to the second detection result.

In this technical scheme, the qualities of the images are judged by using detection in dimensions such as exposure detection, sharpness detection and noise detection when the main characters of the images are objects, so as to rank the plurality of images.

In the aforementioned technical scheme, preferably, the method further comprises: distinguishingly displaying the images in the first quality category and the images in the second quality category according to a received displaying command.

In this technical scheme, the images in the first quality category and the images in the second quality category are distinguishingly displayed, so that the user can operate the images of the two categories separately.

In the aforementioned technical scheme, preferably, the method further comprises: changing the quality category to which the any image belongs from the first quality category into the second quality category, or from the second quality category into the first quality category according to a received image category changing command.

In this technical scheme, the system distinguishes and classifies the images according to logics and algorithms completely. After the system classifies the images, the user can still change the categories of the images according to his/her needs. For example, if the user temporarily determines to save a certain image in the second quality category and not to delete the image, the user can change the image from the second quality category into the first quality category and save the image.

In the aforementioned technical scheme, preferably, the method further comprises: deleting all images in the second quality category according to a received deleting command.

In this technical scheme, the images in the second quality category are uniformly deleted, so that the efficiency of deleting images is greatly improved, and the user does not need to judge the image quality and then delete the image one by one.

According to a second aspect of the present invention, there is provided an image classification apparatus that comprises: an analyzing unit for analyzing the quality of any image; and a determining unit for determining a quality category to which the any image belongs according to the analysis result, wherein the quality categories include a first quality category recommended to be saved and a second quality category recommended to be deleted.

In this technical scheme, the quality of an image can be judged according to the characteristics (for example, definition) of the image so as to classify the image based on the quality of the image, images of which the category meets quality requirements are recommended to be saved, and images of which the category does not meet the quality requirements are recommended to be deleted. In this way, all the images in a category can be saved or deleted through image classification, so that operation time of the user is saved, operation convenience of the user is improved, and a lot of storage space can be saved by deleting images in the category which does not meet the quality requirements.

In the aforementioned technical scheme, preferably, the analyzing unit comprises a calculating unit for calculating the definition degree of the any image according to a preset definition degree calculating function; and the determining unit is for determining that the any image belongs to the second quality category when the definition degree of the any image is smaller than a preset image definition degree, and determining that the any image belongs to the first quality category when the definition degree of the any image is greater than or equal to the preset image definition degree.

In this technical scheme, the definition degree of the image can be used as a quality standard of the image. In general, clear images contain more information than unclear images, and the use of an evaluation function as the preset definition degree calculating function can reflect a numerical value which represents the definition degree of the image. A reference image that the evaluation function is at the maximum value is an image with the optimal definition degree. At present, definition degree evaluating method functions include gradient functions, frequency spectrum functions and entropy functions.

For example, a Tenengrad function in the gradient functions is used to calculate edge gradient values in the horizontal and vertical directions of an image, and the sum of squares of the edge gradient values is used to set a definition degree range of the image. The Tenengrad function uses a soble operator to extract the edge gradient values, and the sum of squares of the gradient values is:

$$f(I) = \sum_x \sum_y [S(x, y)]^2$$

wherein S(x, y) is the convolution with the Soble operator at a point (x, y), and the calculation formula is:

$$S(x,y) = \sqrt{G_x^2(x,y) + G_y^2(x,y)}$$

wherein $G_x(x, y)$ and $G_y(x, y)$ are gradient approximations of the image in the transverse and longitudinal directions, respectively.

In addition, the frequency spectrum function can also be used, and two-dimensional Fourier transformation is used to analyze the spatial frequency of the image, so that high-frequency components and low-frequency components of the image are separated, clear images have sharper and more jumping edges and contain more high-frequency components, and therefore, the definition degree of the image can be determined by evaluating the high-frequency components of the image. However, the use of the frequency spectrum function to evaluate the definition degree causes large calculation quantity which may affect the efficiency of image processing.

In the aforementioned technical scheme, preferably, the apparatus further comprises: a judging unit for acquiring all images and successively determining the similarity degree between a current image and a previous image of the current image in the order of all the images; and a grouping unit for defining the current image and the previous image as images in a same group when the similarity degree is greater than or equal to a preset similarity degree, and defining the current image and the previous image as images in different groups when the similarity degree is smaller than the preset similarity degree.

In this technical scheme, since a user often shoots a plurality of images of different qualities for a certain scene, it is necessary to firstly judge whether the plurality of images belong to the same scene or not, and then to identify the images of the same scene. Images of the same scene, due to their high similarity degree, have small differences in definition even if differences in quality exist, therefore, after initial judgment, the images are generally classified into a same group, and a lot of storage space can be occupied if the images with the same shooting contents are directly saved, but if the images with the same shooting contents are directly deleted, it is difficult to guarantee that the user will not use the images. Therefore, the images with the repeated contents need to be screened again.

In the aforementioned technical scheme, preferably, the judging unit comprises: a dividing unit for individually dividing the current image and the previous image into a plurality of macroblocks, acquiring RGB values of the macroblocks of each image and converting the RGB values into YUV luma and chrominance components; and a similarity degree calculation unit for individually calculating standard deviation values of the YUV components of corresponding macroblocks in the current image and the previous image, and summing up the YUV standard deviation values of all the macroblocks so as to obtain the similarity degree between the current image and the previous image.

In this technical scheme, each image is divided into 32×32 macroblocks, RGB values of the macroblocks of each image are acquired and converted into YUV luma and chrominance components, standard deviation values of the YUV components of corresponding macroblocks in the two images are individually calculated, the YUV standard deviation values of all the macroblocks are summed up, and the two images are considered to be relatively similar when the summation value is less than a certain threshold.

In the aforementioned technical scheme, preferably, the apparatus further comprises a counting unit for counting the number of images in each same group; and the determining unit is also for, when the number of images in any same group is one, determining that the image in the any same group belongs to the first quality category, or prompting a user to select a quality category to which the image in the any same group belongs, and determining that the image in the any same group belongs to the first quality category or the second quality category according to the user's selection; the image classification apparatus further comprises a quality comparing unit for, when the number of images in the any same group is plural, comparing the qualities of a plurality of images, and ranking the plurality of images according to the comparison result; and the determining unit is also for determining that a preset number of top-ranked images in the plurality of images belong to the first quality category, and determining that the rest images in the plurality of images belong to the second quality category.

In this technical scheme, when only one image is shot for a certain scene, even if the quality of the image is low, the user may still want to save the image, and therefore, when it is detected that the number of images in the any same group is one, the group can be directly classified into the first quality category and recommended to be saved; alternatively, the user can be prompted that the image in the group has low quality and should be classified into the second quality category and is provided with two options, i.e. the first quality category and the second quality category, and the category of the image in the group is determined by the user according to his/her own needs. The images with the same contents but different qualities shot for a certain scene by the user are generally classified into the same group because of their high similarity degree, and if the image group is directly saved, a lot of storage space will be occupied and it is also meaningless to save many repeated contents, however, if such image group is directly deleted, it is difficult to guarantee that the user will not use the images. Therefore, the images in the image group can be ranked according to the image quality, and a preset number can be set, so that a preset number of top-ranked images, i.e. the images with relatively high quality, are classified into the first quality category, and the rest lower-ranked images in the image group, i.e. the images with relatively low quality, are classified into the second quality category. In this way, images which may be useful to the user can be guaranteed not to be lost, and a waste of storage space caused by saving too many images with repeated contents can also be avoided.

In the aforementioned technical scheme, preferably, the quality comparing unit comprises: a main character determining unit for determining whether main characters of the plurality of images are human beings or not when the number of images in the same group is plural; a first detecting unit for detecting human body image information of each image in the plurality of images when the determining result is that the main characters of the plurality of images are human beings, so as to obtain a first detection result, wherein the human body image information includes information of the total area and position that a human body occupies in the image, human face information and five-sense-organ information; and a first ranking unit for ranking the plurality of images according to the first detection result.

In this technical scheme, when the main character is a human being, human body detection is firstly conducted and whether a detected human body is the main character in the image is determined from the total area and position that the human body occupies in the image, then human face detection and five-sense-organ detection are conducted on the main character; if no human face or five sense organs is detected, it indicates that the image is not wanted by the user and is probably an image taken by mistake, and the image can be put among low-quality images of the second quality category for further selection; for an image in which both the human face and five sense organs can be normally detected, the quality of the image can be determined by using detection in dimensions such as exposure detection, sharpness detection and noise detection, so as to rank the images in the group.

In the aforementioned technical scheme, preferably, the quality comparing unit further comprises: a second detecting unit for detecting brightness information, sharpness information and noise information of each image in the plurality of images when the determining result is that main characters of the plurality of images are objects, so as to obtain a second detection result; and a second ranking unit for ranking the plurality of images according to the second detection result.

In this technical scheme, the qualities of the images are judged by using detection in dimensions such as exposure detection, sharpness detection and noise detection when the main characters of the images are objects, so as to rank the plurality of images.

In the aforementioned technical scheme, preferably, the apparatus further comprises a display unit for distinguishingly displaying the images in the first quality category and the images in the second quality category according to a received displaying command.

In this technical scheme, the images in the first quality category and the images in the second quality category are distinguishingly displayed, so that the user can operate the images of the two categories separately.

In the aforementioned technical scheme, preferably, the apparatus further comprises a category changing unit for changing the quality category to which the any image belongs from the first quality category into the second quality category, or from the second quality category into the first quality category according to a received image category changing command.

In this technical scheme, the system distinguishes and classifies the images according to logics and algorithms completely. After the system classifies the images, the user can still change the categories of the images according to his/her needs. For example, if the user temporarily determines to save a certain image in the second quality category and not to delete the image, the user can change the image from the second quality category into the first quality category and save the image.

In the aforementioned technical scheme, preferably, the apparatus further comprises a deleting unit for deleting all images in the second quality category according to a received deleting command.

In this technical scheme, the images in the second quality category are uniformly deleted, so that the efficiency of deleting images is greatly improved, and the user does not need to judge the image quality and then delete the image one by one.

By means of the above-mentioned technical scheme, images can be classified according to the quality of the images, so as to distinguish images needed by the user from those not needed by the user, and uniformly delete the images not needed by the user, which makes the user operation easy and convenient, and saves storage space in the meantime.

DETAILED DESCRIPTION

In order for the above-mentioned objectives, features and advantages of the present invention to be more clearly understood, hereinafter, detailed description of the present invention is further provided in combination with the accompanying drawings and specific embodiments. It needs to be noted that, as long as there is no conflict, the embodiments of the present invention as well as individual features in the embodiments can be combined with one another.

A lot of specific details are described hereinafter in order for the present invention to be fully understood, however, the present invention may also be implemented in other ways different from those described herein. Therefore, the protection scope of the present invention is not limited to the specific embodiments disclosed hereinafter.

Figure 2:
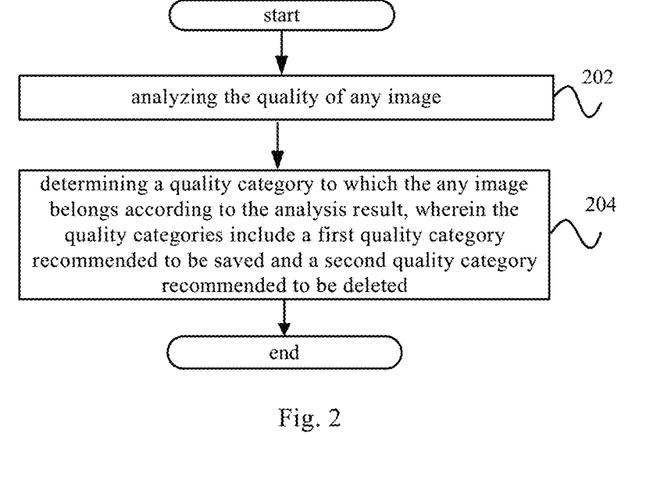
FIG. 2 shows a flowchart of an image classification method according to embodiments of the present invention.

FIG. 2 shows a flowchart of an image classification method according to the embodiments of the present invention.

As shown in FIG. 2, the image classification method according to the embodiments of the present invention comprises:
step 202, the quality of any image is analyzed; and
step 204, a quality category to which the any image belongs is determined according to the analysis result, wherein the quality categories include a first quality category recommended to be saved and a second quality category recommended to be deleted.

In this technical scheme, the quality of an image can be judged according to the characteristics (for example, definition) of the image so as to classify the image based on the quality of the image, images of which the category meets quality requirements are recommended to be saved, and images of which the category does not meet the quality requirements are recommended to be deleted. In this way, all the images in a category can be saved or deleted through image classification, so that operation time of the user is saved, operation convenience of the user is improved, and a lot of storage space can be saved by deleting images in the category which does not meet the quality requirements.

In the above technical scheme, preferably, step 202 specifically comprises that: the definition degree of the any image is calculated according to a preset definition degree calculating function; and step 204 specifically comprises that: the any image is determined to belong to the second quality category when the definition degree of the any image is smaller than a the preset image definition degree, and the any image is determined to belong to the first quality category when the definition degree of the any image is greater than or equal to the preset image definition degree.

In this technical scheme, the definition degree of the image can be used as a quality standard of the image. In general, clear images contain more information than unclear images, and the use of an evaluation function as the preset definition degree calculating function can reflect a numerical value which represents the definition degree of the image. A reference image that the evaluation function is at the maximum value is an image with the optimal definition degree. At present, definition degree evaluating method functions include gradient functions, frequency spectrum functions and entropy functions.

For example, a Tenengrad function in the gradient functions is used to calculate edge gradient values in the horizontal and vertical directions of an image, and the sum of squares of the edge gradient values is used to set a definition degree range of the image. The Tenengrad function uses a soble operator to extract the edge gradient values, and the sum of squares of the gradient values is:

$$f(I) = \sum_x \sum_y [S(x, y)]^2$$

wherein S(x, y) is the convolution with the Soble operator at a point (x, y), and the calculation formula is:

$$S(x,y) = \sqrt{G_x^2(x,y) + G_y^2(x,y)}$$

wherein $G_x(x, y)$ and $G_y(x, y)$ are gradient approximations of the image in the transverse and longitudinal directions, respectively.

In addition, the frequency spectrum function can also be used, and two-dimensional Fourier transformation is used to analyze the spatial frequency of the image, so that high-frequency components and low-frequency components of the image are separated, clear images have sharper and more jumping edges and contain more high-frequency components, and therefore, the definition degree of the image can be determined by evaluating the high-frequency components of the image. However, the use of the frequency spectrum function to evaluate the definition degree causes large calculation quantity which may affect the efficiency of image processing.

In the above technical scheme, preferably, the method further comprises that: all images are acquired, the similarity degree between a current image and a previous image of the current image are successively determined in the order of all the images, the current image and the previous image are defined as images in a same group when the similarity degree is greater than or equal to a preset similarity degree, and the current image and the previous image are defined as images in different groups when the similarity degree is smaller than the preset similarity degree.

In the technical scheme, since a user often shoots a plurality of images of different qualities for a certain scene, it is necessary to firstly judge whether the plurality of images belong to the same scene or not, and then to identify the images of the same scene. Images of the same scene, due to their high similarity degree, have small differences in definition even if differences in quality exist, therefore, after initial judgment, the images are generally classified into a same group, and a lot of storage space can be occupied if the images with the same shooting contents are directly saved, but if the images with the same shooting contents are directly deleted, it is difficult to guarantee that the user will not use the images. Therefore, the images with the repeated contents need to be screened again.

In the above technical scheme, preferably, the step that the similarity degree between a current image and a previous image of the current image is determined, specially comprises: the current image and the previous image are individually divided into a plurality of macroblocks, and RGB values of the macroblocks of each image are acquired and converted into YUV luma and chrominance components; standard deviation values of the YUV components of corresponding macroblocks in the current image and the previous image are individually calculated; and the YUV standard deviation values of all the macroblocks are summed up so as to obtain the similarity degree between the current image and the previous image.

In this technical scheme, each image is divided into 32×32 macroblocks, RGB values of the macroblocks of each image are acquired and converted into YUV luma and chrominance components, standard deviation values of the YUV components of corresponding macroblocks in the two images are individually calculated, the YUV standard deviation values of all the macroblocks are summed up, and the two images are considered to be relatively similar when the summation value is less than a certain threshold.

In the above technical scheme, preferably, the method further comprises that: the number of images in each same group is counted; and step 204 further comprises that: when the number of images in the any same group is one, the image in the any group is determined to belong to the first quality category, or the user is prompted to select a quality category to which the image in the any same group belongs and the image in the any same group is determined to belong to the first quality category or the second quality category according to the user's selection; when the number of images in the any same group is plural, the qualities of a plurality of images are compared, and the plurality of images are ranked according to the comparison result; and a preset number of top-ranked images in the plurality of images are determined to belong to the first quality category, and the rest images in the plurality of images are determined to belong to the second quality category.

In this technical scheme, when only one image is shot for a certain scene, even if the quality of the image is low, the user may still want to save the image, and therefore, when it is detected that the number of images in the any same group is one, the group can be directly classified into the first quality category and recommended to be saved; alternatively, the user can be prompted that the image in the group has low quality and should be classified into the second quality category and is provided with two options, i.e. the first quality category and the second quality category, and the category of the image in the group is determined by the user according to his/her own needs. The images with the same contents but different qualities shot for a certain scene by the user are generally classified into the same group because of their high similarity degree, and if the image group is directly saved, a lot of storage space will be occupied and it is also meaningless to save many repeated contents, however, if such image group is directly deleted, it is difficult to guarantee that the user will not use the images. Therefore, the images in the image group can be ranked according to the image quality, and a preset number can be set, so that a preset number of top-ranked images, i.e. the images with relatively high quality, are classified into the first quality category, and the rest lower-ranked images in the image group, i.e. the images with relatively low quality, are classified into the second quality category. In this way, images which may be useful to the user can be guaranteed not to be lost, and a waste of storage space caused by saving too many images with repeated contents can also be avoided.

In the above technical scheme, preferably, the step that when the number of images in the any same group is plural, the qualities of a plurality of images are compared, and the plurality of images are ranked according to the comparison result, specifically comprises: whether the main characters of the images are human beings or not is determined when the number of images in the same group is plural; human body image information of each image in the plurality of images is detected when the determining result is that the main characters of the plurality of images are human beings, so as to obtain a first detection result, wherein the human body image information includes information of the total area and position that a human body occupies in the image, human face information and five-sense-organ information; and the plurality of images are ranked according to the first detection result.

In this technical scheme, when the main character is a human being, human body detection is firstly conducted and whether a detected human body is the main character in the image is determined from the total area and position that the human body occupies in the image, then human face detection and five-sense-organ detection are conducted on the main character; if no human face or five sense organs is detected, it indicates that the image is not wanted by the user and is probably an image taken by mistake, and the image can be put among low-quality images of the second quality category for further selection; for an image in which both the human face and five sense organs can be normally detected, the quality of the image can be determined by using detection in dimensions such as exposure detection, sharpness detection and noise detection, so as to rank the images in the group.

Wherein, the exposure detection is to judge whether the image is over-exposed or not by determining whether an average brightness of the image is greater than a threshold, and over-exposed images are put into the second quality category by the exposure detection and recommended to be deleted. The average brightness is equal to the product of (total picture brightness value/total pixel number) and a scene exposure coefficient. The scene exposure coefficient is related to a specific scene, the concept of the scene exposure coefficient is designed based on the consideration that different scenes have different brightness values, for example, scenes of snow and sunlight have very high brightness, and the higher the brightness of the scene is, the smaller the scene exposure coefficient is, thereby preventing that an average brightness value obtained in scenes of snow and sunlight exceeds the threshold. The sharpness detection is to conduct statistics on grey-scale changes in a certain edge direction of the image through an edge sharpness detection algorithm so as to evaluate the quality of the image, that is, the intenser the grey-scale changes are, the clearer the edge is, and the higher the quality of the image is. The noise detection is to identify noise based on a grey correlation coefficient in each pixel between a noise-containing image and a corresponding mean value image.

In the above technical scheme, preferably, the step that when the number of images in the any same group is plural, the qualities of a plurality of images are compared, and the images are ranked according to the comparison result, further comprises that: brightness information, sharpness information and noise information of each image in the plurality of images are detected when the main characters of the plurality of images are objects, so as to obtain a second detection result; and the plurality of images are ranked according to the second detection result.

In this technical scheme, the qualities of the images are judged by using detection in dimensions such as exposure detection, sharpness detection and noise detection when the main characters of the images are objects, so as to rank the plurality of images.

In the above technical scheme, preferably, the method further comprises that: the images in the first quality category and the images in the second quality category are distinguishingly displayed according to a received displaying command.

In this technical scheme, the images in the first quality category and the images in the second quality category are distinguishingly displayed, so that the user can operate the images of the two categories separately.

In the above technical scheme, preferably, the method further comprises that: the quality category to which the any image belongs is changed from the first quality category into the second quality category, or from the second quality category into the first quality category according to a received image category changing command.

In this technical scheme, the system distinguishes and classifies the images according to logics and algorithms completely. After the system classifies the images, the user can still change the categories of the images according to his/her needs. For example, if the user temporarily determines to save a certain image in the second quality category and not to delete the image, the user can change the image from the second quality category into the first quality category and save the image.

In the above technical scheme, preferably, the method further comprises that: all images in the second quality category are deleted according to a received deletion command.

In this technical scheme, the images in the second quality category are uniformly deleted, so that the efficiency of deleting images is greatly improved, and the user does not need to judge the image quality and then delete the image one by one.

Figure 3:
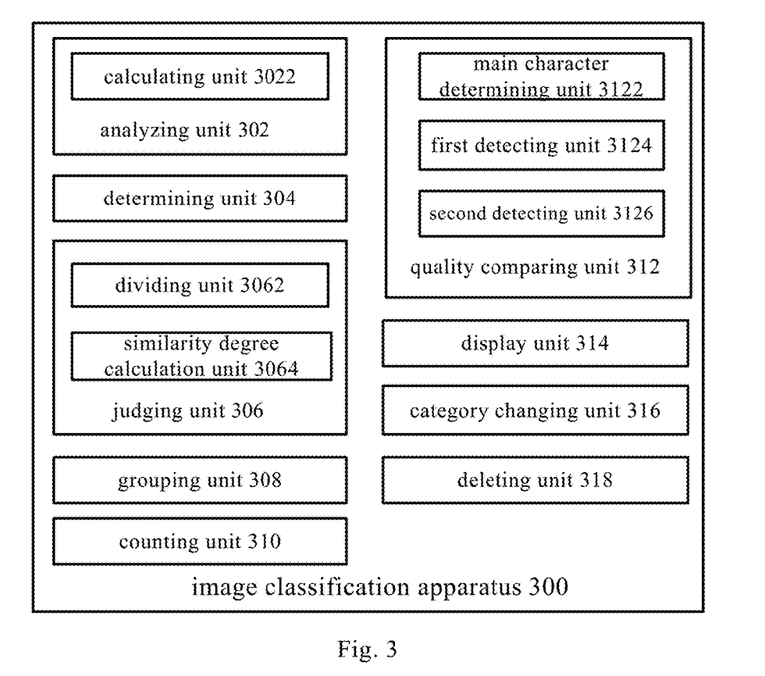
FIG. 3 shows a block diagram of an image classification apparatus according to embodiments of the present invention.

FIG. 3 shows a block diagram of an image classification apparatus according to embodiments of the present invention.

As shown in FIG. 3, the image classification apparatus 300 according to the embodiments of the present invention comprises: an analyzing unit 302 for analyzing the quality of any image; and a determining unit 304 for determining a quality category to which the any image belongs according to the analysis result, wherein the quality categories include a first quality category recommended to be saved and a second quality category recommended to be deleted.

In this technical scheme, the quality of an image can be judged according to the characteristics (for example, definition) of the image so as to classify the image based on the quality of the image, images of which the category meets quality requirements are recommended to be saved, and images of which the category does not meet the quality requirements are recommended to be deleted. In this way, all the images in a category can be saved or deleted through image classification, so that operation time of the user is saved, operation convenience of the user is improved, and a lot of storage space can be saved by deleting images in the category which does not meet the quality requirements.

In the aforementioned technical scheme, preferably, the analyzing unit 302 comprises a calculating unit 3022 for calculating the definition degree of the any image according to a preset definition degree calculating function; and the determining unit 304 is for determining that the any image belongs to the second quality category when the definition degree of the any image is smaller than a preset image definition degree, and determining that the any image belongs to the first quality category when the definition degree of the any image is greater than or equal to the preset image definition degree.

In this technical scheme, the definition degree of the image can be used as a quality standard of the image. In general, clear images contain more information than unclear images, and the use of an evaluation function as the preset definition degree calculating function can reflect a numerical value which represents the definition degree of the image. A reference image that the evaluation function is at the maximum value is an image with the optimal definition degree. At present, definition degree evaluating method functions include gradient functions, frequency spectrum functions and entropy functions.

For example, a Tenengrad function in the gradient functions is used to calculate edge gradient values in the horizontal and vertical directions of an image, and the sum of squares of the edge gradient values is used to set a definition degree range of the image. The Tenengrad function uses a soble operator to extract the edge gradient values, and the sum of squares of the gradient values is:

$$f(I) = \sum_x \sum_y [S(x, y)]^2$$

wherein S(x, y) is the convolution with the Soble operator at a point (x, y), and the calculation formula is:

$$S(x,y) = \sqrt{G_x^2(x,y) + G_y^2(x,y)}$$

wherein $G_x(x, y)$ and $G_y(x, y)$ are gradient approximations of the image in the transverse and longitudinal directions, respectively.

In addition, the frequency spectrum function can also be used, and two-dimensional Fourier transformation is used to analyze the spatial frequency of the image, so that high-frequency components and low-frequency components of the image are separated, clear images have sharper and more jumping edges and contain more high-frequency components, and therefore, the definition degree of the image can be determined by evaluating the high-frequency components of the image. However, the use of the frequency spectrum function to evaluate the definition degree causes large calculation quantity which may affect the efficiency of image processing.

In the aforementioned technical scheme, preferably, the apparatus further comprises: a judging unit 306 for acquiring all images and successively determining the similarity degree between a current image and a previous image of the current image in the order of all the images; and a grouping unit 308 for defining the current image and the previous image as images in a same group when the similarity degree is greater than or equal to a preset similarity degree, and defining the current image and the previous image as images in different groups when the similarity degree is smaller than the preset similarity degree.

In this technical scheme, since a user often shoots a plurality of images of different qualities for a certain scene, it is necessary to firstly judge whether the plurality of images belong to the same scene or not, and then to identify the images of the same scene. Images of the same scene, due to their high similarity degree, have small differences in definition even if differences in quality exist, therefore, after initial judgment, the images are generally classified into a same group, and a lot of storage space can be occupied if the images with the same shooting contents are directly saved, but if the images with the same shooting contents are directly deleted, it is difficult to guarantee that the user will not use the images. Therefore, the images with the repeated contents need to be screened again.

In the aforementioned technical scheme, preferably, the judging unit comprises: a dividing unit 3062 for individually dividing the current image and the previous image into a plurality of macroblocks, acquiring RGB values of the macroblocks of each image and converting the RGB values into YUV luma and chrominance components; and a similarity degree calculation unit 3064 for individually calculating standard deviation values of the YUV components of corresponding macroblocks in the current image and the previous image, and summing up the YUV standard deviation values of all the macroblocks so as to obtain the similarity degree between the current image and the previous image.

In this technical scheme, each image is divided into 32×32 macroblocks, RGB values of the macroblocks of each image are acquired and converted into YUV luma and chrominance components, standard deviation values of the YUV components of corresponding macroblocks in the two images are individually calculated, the YUV standard deviation values of all the macroblocks are summed up, and the two images are considered to be relatively similar when the summation value is less than a certain threshold.

In the aforementioned technical scheme, preferably, the apparatus further comprises a counting unit 310 for counting the number of images in each same group; and the determining unit 304 is also for, when the number of images in any same group is one, determining that the image in the any same group belongs to the first quality category, or prompting a user to select a quality category to which the image in the any same group belongs, and determining that the image in the any same group belongs to the first quality category or the second quality category according to the user's selection; the image classification apparatus 300 further comprises a quality comparing unit 312 for, when the number of images in the any same group is plural, comparing the qualities of a plurality of images, and ranking the plurality of images according to the comparison result; and the determining unit 304 is also for determining that a preset number of top-ranked images in the plurality of images belong to the first quality category, and determining that the rest images in the plurality of images belong to the second quality category.

In this technical scheme, when only one image is shot for a certain scene, even if the quality of the image is low, the user may still want to save the image, and therefore, when it is detected that the number of images in the any same group is one, the group can be directly classified into the first quality category and recommended to be saved; alternatively, the user can be prompted that the image in the group has low quality and should be classified into the second quality category and is provided with two options, i.e. the first quality category and the second quality category, and the category of the image in the group is determined by the user according to his/her own needs. The images with the same contents but different qualities shot for a certain scene by the user are generally classified into the same group because of their high similarity degree, and if the image group is directly saved, a lot of storage space will be occupied and it is also meaningless to save many repeated contents, however, if such image group is directly deleted, it is difficult to guarantee that the user will not use the images. Therefore, the images in the image group can be ranked according to the image quality, and a preset number can be set, so that a preset number of top-ranked images, i.e. the images with relatively high quality, are classified into the first quality category, and the rest lower-ranked images in the image group, i.e. the images with relatively low quality, are classified into the second quality category. In this way, images which may be useful to the user can be guaranteed not to be lost, and a waste of storage space caused by saving too many images with repeated contents can also be avoided.

In the aforementioned technical scheme, preferably, the quality comparing unit 312 comprises: a main character determining unit 3122 for determining whether main characters of the plurality of images are human beings or not when the number of images in the same group is plural; a first detecting unit 3124 for detecting human body image information of each image in the plurality of images when the determining result is that the main characters of the plurality of images are human beings, so as to obtain a first detection result, wherein the human body image information includes information of the total area and position that a human body occupies in the image, human face information and five-sense-organ information; and a first ranking unit for ranking the plurality of images according to the first detection result.

In this technical scheme, when the main character is a human being, human body detection is firstly conducted and whether a detected human body is the main character in the image is determined from the total area and position that the human body occupies in the image, then human face detection and five-sense-organ detection are conducted on the main character; if no human face or five sense organs is detected, it indicates that the image is not wanted by the user and is probably an image taken by mistake, and the image can be put among low-quality images of the second quality category for further selection; for an image in which both the human face and five sense organs can be normally detected, the quality of the image can be determined by using detection in dimensions such as exposure detection, sharpness detection and noise detection, so as to rank the images in the group.

In the aforementioned technical scheme, preferably, the quality comparing unit 312 further comprises: a second detecting unit 3126 for detecting brightness information, sharpness information and noise information of each image in the plurality of images when the determining result is that main characters of the plurality of images are objects, so as to obtain a second detection result; and a second ranking unit for ranking the plurality of images according to the second detection result.

In this technical scheme, the qualities of the images are judged by using detection in dimensions such as exposure detection, sharpness detection and noise detection when the main characters of the images are objects, so as to rank the plurality of images.

In the aforementioned technical scheme, preferably, the apparatus further comprises a display unit 314 for distinguishingly displaying the images in the first quality category and the images in the second quality category according to a received displaying command.

In this technical scheme, the images in the first quality category and the images in the second quality category are distinguishingly displayed, so that the user can operate the images of the two categories separately.

In the aforementioned technical scheme, preferably, the apparatus further comprises a category changing unit 316 for changing the quality category to which the any image belongs from the first quality category into the second quality category, or from the second quality category into the first quality category according to a received image category changing command.

In this technical scheme, the system distinguishes and classifies the images according to logics and algorithms completely. After the system classifies the images, the user can still change the categories of the images according to his/her needs. For example, if the user temporarily determines to save a certain image in the second quality category and not to delete the image, the user can change the image from the second quality category into the first quality category and save the image.

In the aforementioned technical scheme, preferably, the apparatus further comprises a deleting unit 318 for deleting all images in the second quality category according to a received deleting command.

In this technical scheme, the images in the second quality category are uniformly deleted, so that the efficiency of deleting images is greatly improved, and the user does not need to judge the image quality and then delete the image one by one.

Figure 4:
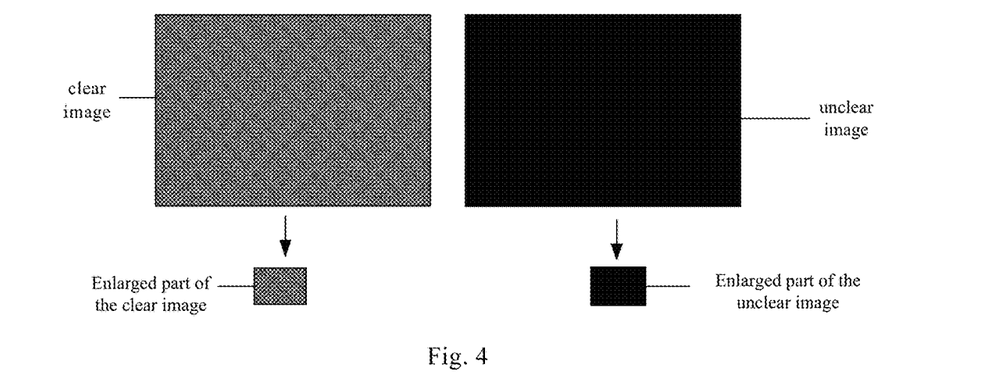
FIG. 4 shows a comparison diagram of a clear image and an unclear image according to embodiments of the present invention.

FIG. 4 shows a comparison diagram of a clear image and an unclear image according to embodiments of the present invention.

As shown in FIG. 4, after the image is enlarged, it can be found out that, there is significant difference between the definition degrees of the clear image and the unclear image, the image with a higher definition degree has better image quality. Therefore, the definition degree of an image can be used as a quality standard of the image, so as to classify the images.

It can be known based on the partial enlarged clear image and unclear image, under normal circumstances, clear images contain more information than unclear images, and the use of an evaluation function as the preset definition degree calculating function can reflect a numerical value which represents the definition degree of the image. A reference image that the evaluation function is at the maximum value is an image with the optimal definition degree. At present, definition degree evaluating method functions include gradient functions, frequency spectrum functions and entropy functions.

For example, a Tenengrad function in the gradient functions is used to calculate edge gradient values in the horizontal and vertical directions of an image, and the sum of squares of the edge gradient values is used to set a definition degree range of the image. The Tenengrad function uses a soble operator to extract the edge gradient values, and the sum of squares of the gradient values is:

$$f(I) = \sum_x \sum_y [S(x, y)]^2$$

wherein S(x, y) is the convolution with the Soble operator at a point (x, y), and the calculation formula is:

$$S(x,y) = \sqrt{G_x^2(x,y) + G_y^2(x,y)}$$

wherein $G_x(x, y)$ and $G_y(x, y)$ are gradient approximations of the image in the transverse and longitudinal directions, respectively.

In addition, the frequency spectrum function can also be used, and two-dimensional Fourier transformation is used to analyze the spatial frequency of the image, so that high-frequency components and low-frequency components of the image are separated, clear images have sharper and more jumping edges and contain more high-frequency components, and therefore, the definition degree of the image can be determined by evaluating the high-frequency components of the image. However, the use of the frequency spectrum function to evaluate the definition degree causes large calculation quantity which may affect the efficiency of image processing.

After image quality evaluation according to definition degrees, the determined low quality images can be extracted and classified into "low quality images". Thus, the "low quality images" that do not meet quality requirements can be uniformly deleted, thereby making the user operation easy and convenient, and also saving a lot of storage space.

Figure 5A:
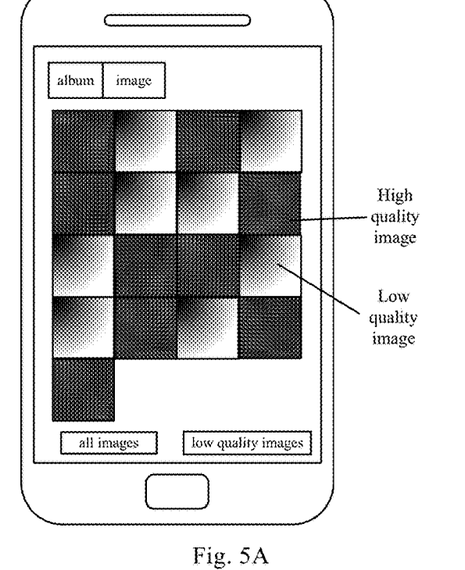
FIG. 5A and FIG. 5B show a mobile phone album interface according to embodiments of the present invention.
Figure 5B:
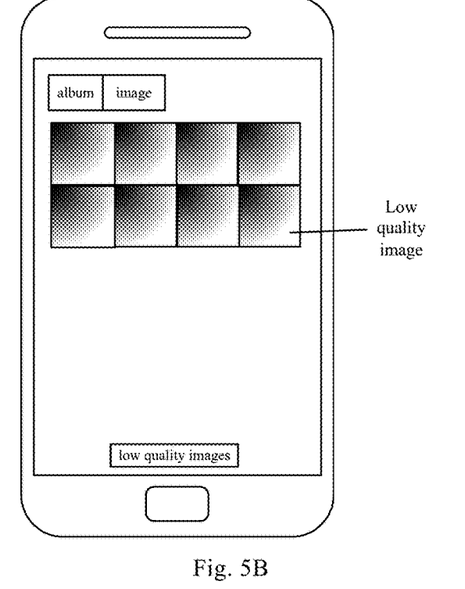

FIG. 5A and FIG. 5B show a mobile phone album interface according to embodiments of the present invention.

As shown in FIG. 5A, the option of "all images" and the option of "low quality images" are set in the mobile phone album interface. The searching and judging process of the low quality images can be realized by two ways: all the taken images may be processed in batch, wherein each image in the album is judged respectively to distinguish the low quality image category; or, the image is judged each time when an image is taken, and the low quality image is classified into the low quality image category. Such a searching and judging process may be completed at the backstage of the album. After the processing is completed, the option of "all images" and the option of "low quality images" are displayed in the mobile phone album interface, so that the user is allowed to choose whether to view all the images or only view the low quality images.

When the user choose the option of "low quality images", the low quality image interface as shown in FIG. 5B can be accessed. This interface only displays the low quality images that has been automatically distinguished by the mobile phone, and shows them in front of the user's eyes for the user to decide whether to delete some of the images therein.

The technical scheme of the present invention has been described above in detail in combination with the accompanying drawings. By means of the technical scheme of the present invention, images can be classified according to the quality of the images, so as to distinguish images needed by the user from those not needed by the user, and uniformly delete the images not needed by the user, which makes the user operation easy and convenient, and saves storage space in the meantime.

According to embodiments of the present invention, there is also provided a program product stored on a non-transitory computer-readable storage medium, used for classifying images on a terminal, the program product comprises computer-executable instructions to cause a computer system to perform the following steps: analyzing the quality of any image; and determining a quality category to which the any image belongs according to the analysis result, wherein the quality categories include a first quality category recommended to be saved and a second quality category recommended to be deleted.

According to embodiments of the present invention, there is also provided a non-transitory computer-readable storage medium that stores a program product for classifying images on a terminal, the program product comprises computer-executable instructions to cause a computer system to perform the following steps: analyzing the quality of any image; and determining a quality category to which the any image belongs according to the analysis result, wherein the quality categories include a first quality category recommended to be saved and a second quality category recommended to be deleted.

According to embodiments of the present invention, there is also provided a computer-readable program, the program causes a computer to perform the image classification method according to any one of the above-mentioned technical schemes.

According to embodiments of the present invention, there is also provided a storage medium that stores a computer-readable program, wherein, the computer-readable program causes a computer to perform the image classification method according to any one of the above-mentioned technical schemes.

In the present disclosure, terms such as "first", "second" are merely for the purpose of describing, and are not to be construed as an indication or implication of relative importance thereof; the term "plural" means two or more. For those skilled in the art, the specific meaning of the aforementioned terms in the present disclosure can be understood according to specific circumstances.

The above described is just preferred embodiments of the present invention, and is not intended to limit the present invention. For those skilled in the art, the present invention can have various changes and modifications. Any changes, equivalent substitutions, modifications etc. made within the concept and principle of present invention should be embraced within the protection scope of the present invention.

The invention claimed is:

1. An image classification method, comprising the following steps:
   an analyzing step of analyzing the quality of any image;
   a determining step of determining a quality category to which the any image belongs according to the analysis result, wherein the quality categories include a first quality category recommended to be saved and a second quality category recommended to be deleted; and
   acquiring all images, successively determining the similarity degree between a current image and a previous image of the current image in the order of all the images, defining the current image and the previous image as images in a same group when the similarity degree is greater than or equal to a preset similarity degree, and defining the current image and the previous image as images in different groups when the similarity degree is smaller than the preset similarity degree;
   wherein, the step of determining the similarity degree between a current image and a previous image of the current image specially comprises:
   individually dividing the current image and the previous image into a plurality of macroblocks, acquiring RGB values of the macroblocks of each image and converting the RGB values into YUV luma and chrominance components; and
   individually calculating standard deviation values of the YUV components of corresponding macroblocks in the current image and the previous image, and summing up the YUV standard deviation values of all the macroblocks so as to obtain the similarity degree between the current image and the previous image.

2. The image classification method of claim 1, wherein, the analyzing step specifically comprises:
   calculating the definition degree of the any image according to a preset definition degree calculating function; and
   the determining step specifically comprises:
   determining that the any image belongs to the second quality category when the definition degree of the any image is smaller than a preset image definition degree, and
   determining that the any image belongs to the first quality category when the definition degree of the any image is greater than or equal to the preset image definition degree.

3. The image classification method of claim 1, further comprising:
   counting the number of images in each same group;
   when the number of images in any same group is one, determining that the image in the any same group belongs to the first quality category, or prompting a user to select a quality category to which the image in the any same group belongs, and determining that the image in the any same group belongs to the first quality category or the second quality category according to the user's selection;
   when the number of images in the any same group is plural, comparing the qualities of a plurality of images, and ranking the plurality of images according to the comparison result; and
   determining that a preset number of top-ranked images in the plurality of images belong to the first quality category, and determining that the rest images in the plurality of images belong to the second quality category.

4. The image classification method of claim 3, wherein, the step of when the number of images in the any same group is plural, comparing the qualities of a plurality of images, and ranking the plurality of images according to the comparison result specifically comprises:
   determining whether main characters of the plurality of images are human beings or not when the number of images in the same group is plural;
   detecting human body image information of each image in the plurality of images when the determining result is that the main characters of the plurality of images are human beings, so as to obtain a first detection result, wherein the human body image information includes information of the total area and position that a human body occupies in the image, human face information and five-sense-organ information; and ranking the plurality of images according to the first detection result.

5. The image classification method of claim 4, wherein, the step of comparing the qualities of a plurality of images when the number of images in the any same group is plural, and ranking the plurality of images according to the comparison result further comprises:
    detecting brightness information, sharpness information and noise information of each image in the plurality of images when the determining result is that main characters of the plurality of images are objects, so as to obtain a second detection result; and
    ranking the plurality of images according to the second detection result.

6. The image classification method of claim 1, further comprising:
    distinguishingly displaying the images in the first quality category and the images in the second quality category according to a received displaying command.

7. The image classification method of claim 1, further comprising:
    changing the quality category to which the any image belongs from the first quality category into the second quality category, or from the second quality category into the first quality category according to a received image category changing command.

8. The image classification method of any one of claims 1-7, further comprising:
    deleting all images in the second quality category according to a received deleting command.

9. An image classification apparatus, comprising:
    an analyzing unit for analyzing the quality of any image;
    a determining unit for determining a quality category to which the any image belongs according to the analysis result, wherein the quality categories include a first quality category recommended to be saved and a second quality category recommended to be deleted;
    a judging unit for acquiring all images and successively determining the similarity degree between a current image and a previous image of the current image in the order of all the images; and
    a groping unit for defining the current image and the previous image as images in a same group when the similarity degree is greater than or equal to a preset similarity degree, and defining the current image and the previous image as images in different groups when the similarity degree is smaller than the preset similarity degree;
    wherein, the judging unit comprises:
        a dividing unit for individually dividing the current image and the previous image into a plurality of macroblocks, acquiring RGB values of the macroblocks of each image and converting the RGB values into YUV luma and chrominance components; and
        a similarity degree calculation unit for individually calculating standard deviation values of the YUV components of corresponding macroblocks in the current image and the previous image and summing up the YUV standard deviation values of all the macroblocks so as to obtain the similarity degree between the current image and the previous image.

10. The image classification apparatus of claim 9, wherein,
    the analyzing unit comprises:
        a calculating unit for calculating the definition degree of the any image according to a preset definition degree calculating function; and
    the determining unit is for:
        determining that the any image belongs to the second quality category when the definition degree of the any image is smaller than a preset image definition degree, and
        determining that the any image belongs to the first quality category when the definition degree of the any image is greater than or equal to the preset image definition degree.

11. The image classification apparatus of claim 9, further comprising:
    a counting unit for counting the number of images in each same group; and
    the determining unit is also for:
        when the number of images in any same group is one, determining that the image in the any same group belongs to the first quality category, or
        prompting a user to select a quality category to which the image in the any same group belongs, and determining that the image in the any same group belongs to the first quality category or the second quality category according to the user's selection;
    the image classification apparatus further comprises:
        a quality comparing unit for, when the number of images in the any same group is plural, comparing the qualities of a plurality of images, and ranking the plurality of images according to the comparison result; and
    the determining unit is also for:
        determining that a preset number of top-ranked images in the plurality of images belong to the first quality category, and determining that the rest images in the plurality of images belong to the second quality category.

12. The image classification apparatus of claim 11, wherein, the quality comparing unit comprises:
    a main character determining unit for determining whether main characters of the plurality of images are human beings or not when the number of images in the same group is plural;
    a first detecting unit for detecting human body image information of each image in the plurality of images when the determining result is that the main characters of the plurality of images are human beings, so as to obtain a first detection result, wherein the human body image information includes information of the total area and position that a human body occupies in the image, human face information and five-sense-organ information; and
    a first ranking unit for ranking the plurality of images according to the first detection result.

13. The image classification apparatus of claim 12, wherein, the quality comparing unit further comprises:
    a second detecting unit for detecting brightness information, sharpness information and noise information of each image in the plurality of images when the determining result is that main characters of the plurality of images are objects, so as to obtain a second detection result; and
    a second ranking unit for ranking the plurality of images according to the second detection result.

14. The image classification apparatus of claim 9, further comprising:
    a display unit for distinguishingly displaying the images in the first quality category and the images in the second quality category according to a received displaying command.

15. The image classification apparatus of claim 9, further comprising:
- a category changing unit for changing the quality category to which the any image belongs from the first quality category into the second quality category, or from the second quality category into the first quality category according to a received image category changing command.

16. The image classification apparatus of any one of claims 9, 10, or 11-15, further comprising:
- a deleting unit for deleting all images in the second quality category according to a received deleting command.

* * * * *